(12) United States Patent
Dror et al.

(10) Patent No.: US 7,797,566 B2
(45) Date of Patent: Sep. 14, 2010

(54) APPLICATION CLUSTER IN SECURITY GATEWAY FOR HIGH AVAILABILITY AND LOAD SHARING

(75) Inventors: Amit Dror, Shaar Hagolan (IL); Omer Schory, Barkan (IL)

(73) Assignee: Check Point Software Technologies Ltd., Ramat Gan (IL)

( * ) Notice: Subject to any disclaimer, the term of this patent is extended or adjusted under 35 U.S.C. 154(b) by 771 days.

(21) Appl. No.: 11/456,575

(22) Filed: Jul. 11, 2006

(65) Prior Publication Data

US 2008/0016386 A1 Jan. 17, 2008

(51) Int. Cl.
*G06F 11/00* (2006.01)

(52) U.S. Cl. ......................................................... 714/4
(58) Field of Classification Search ...................... 714/4
See application file for complete search history.

(56) References Cited

U.S. PATENT DOCUMENTS

| | | | | |
|---|---|---|---|---|
| 7,055,053 B2* | 5/2006 | Saika | ............................... | 714/4 |
| 7,260,625 B2* | 8/2007 | Sugiura et al. | ............... | 709/223 |
| 7,287,186 B2* | 10/2007 | McCrory et al. | ............... | 714/13 |
| 2002/0112189 A1* | 8/2002 | Syvanne et al. | ............... | 713/201 |
| 2003/0126240 A1* | 7/2003 | Vosseler | ...................... | 709/221 |
| 2003/0126388 A1* | 7/2003 | Yamagami | .................... | 711/162 |
| 2004/0153719 A1* | 8/2004 | Achiwa et al. | .................. | 714/5 |
| 2006/0015773 A1* | 1/2006 | Singh et al. | .................... | 714/13 |
| 2006/0089965 A1* | 4/2006 | Fontes et al. | ................. | 709/203 |
| 2006/0112244 A1* | 5/2006 | Buah et al. | ................... | 711/162 |

* cited by examiner

*Primary Examiner*—Joshua A Lohn
(74) *Attorney, Agent, or Firm*—Mark M. Friedman (57) ABSTRACT

A method for load sharing and high availability in a cluster of computers. The cluster includes a first computer and a second computer which perform a task An active application runs in the first computer and a standby application is installed in the second computer. The active application and the standby application are included in an application group. A first plurality of applications is installed in the first computer; the first plurality includes the running active application. The active application performs the task and stores in memory of the first computer state parameters and a policy. A synchronized copy of the state parameters and the policy pertaining to the task is maintained by storing in memory of the second computer. Preferably, the cluster is in a security gateway between data networks and performs a task related to security of one or more of the networks.

5 Claims, 8 Drawing Sheets

Per Virtual System Failover

FIG. 1 VSX cluster
PRIOR ART

FIG. 2
PRIOR ART

FIG. 3
Per Virtual System Failover

FIG. 4
Backup state virtual system

FIG. 4a
Backup state virtual system

FIG. 4b
Connection failure to cluster member

APPLICATION CLUSTER IN SECURITY GATEWAY FOR HIGH AVAILABILITY AND LOAD SHARING

CROSS REFERENCE TO RELATED APPLICATIONS

Not applicable

FIELD AND BACKGROUND OF THE INVENTION

The present invention relates to computer systems and, more particularly, to a method and system architecture for providing load sharing and/or high availability between virtual systems or applications running in a cluster of computers preferably in a security gateway between data networks Specifically, the applications residing in different computers of the cluster synchronize state parameters and policy between the applications.

There is a growing need within large enterprises to extend networks, applications, and corporate databases to business partners, and employees working off site and other guest users. At the same time, many administrators are starting to divide infrastructure among various departments and groups using virtual LANs (VLANs). Although VLAN technology is effective at functionally dividing these networks companies are still required to deploy separate security systems, e.g. firewall, virtual private networks (VPN), and intrusion prevention devices in front of each network segment to achieve comprehensive security The extension of the corporate networks and subdivision into separate VLANs results in an enterprise network which is expensive and carries a large management overhead.

In order to alleviate this problem Check Point™ (Check Point Software Technologies Ltd.) offers a product VPN-1® Virtual System Extension (VSX™) as a high-speed, multi-policy virtualized security solution designed for large-scale enterprise environments like data centers and campus networks. The VSX cluster is composed of multiple virtual security systems, each of which is a complete virtualized version of a VPN gateway.

Figure 1:
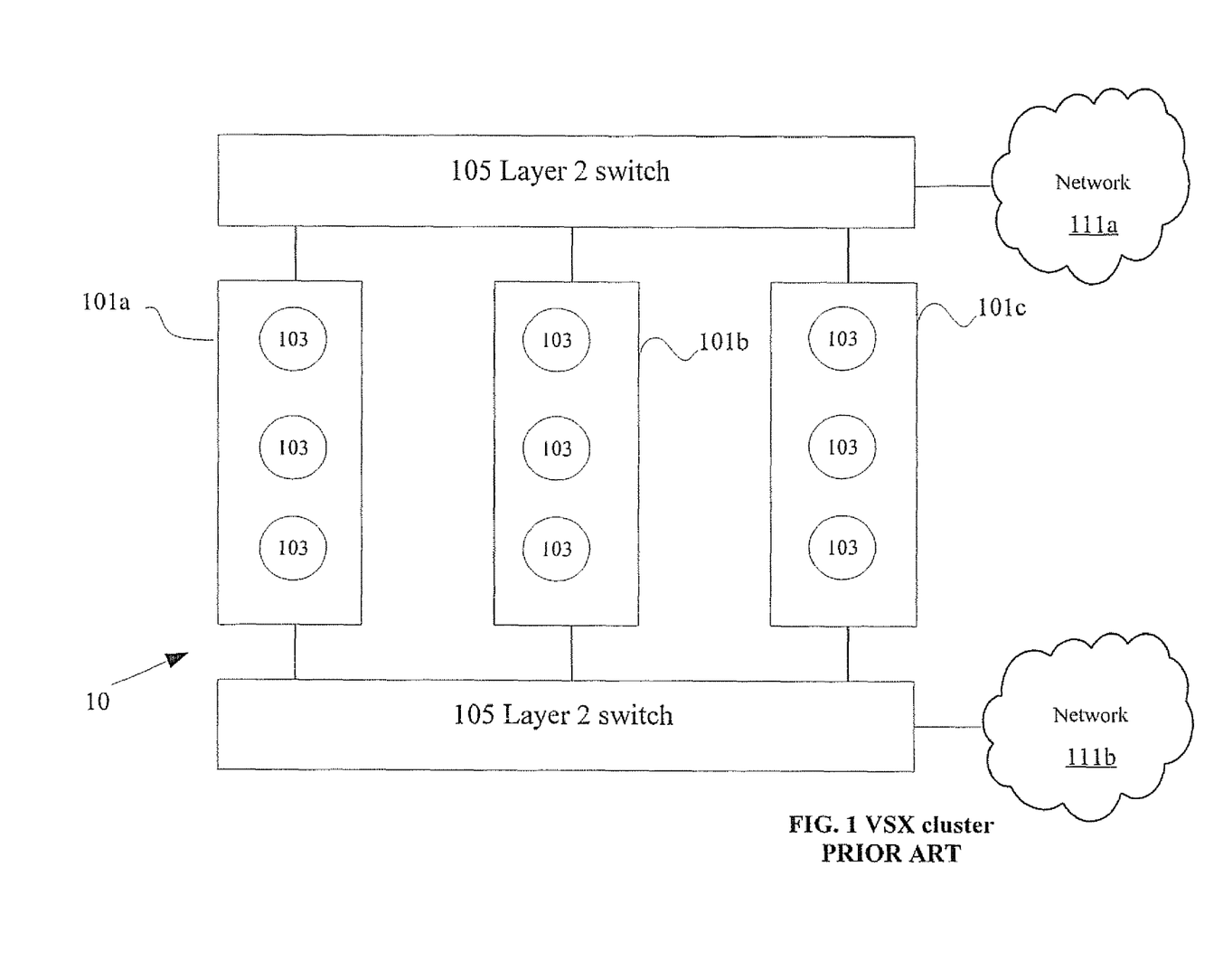
FIG. 1 is a simplified system block diagram of a prior art virtual system extension (VSX) cluster.

Referring now to FIG. 1 (prior art) a simplified system block diagram of a prior art virtual system extension (VSX) cluster 10 is illustrated. Cluster 10 is composed of multiple computers or cluster members 101 attached in parallel as a cluster typically between Layer 2 switches 105. Layer 2 switches 105 interface with respective networks 111. Multiple virtual systems 103, e.g. firewall applications, are installed and ruining in each cluster member 101. In a typical application, cluster is installed and operated by a service provider and two cluster members 101a and 101b for instance are provided to an enterprise, with 101a active and 101b available for backup and failover if 101a fails. In the case of failover in this example, virtual systems 103 of cluster member 101b assume the tasks of virtual systems 103a of cluster member 101a. A drawback of this failover configuration is that if a failure occurs only in one virtual system 103 of cluster member 101a, for example as a result of a software error, or a hardware failure that affects only one virtual system 103 on the same cluster member, the other two operable virtual systems 103 of cluster member 101a are removed from service and not available until recovery from failures Furthermore, since a failover is not entirely risk free, there is a possibility of adverse consequences to sub-networks being serviced during failover by otherwise operable virtual systems 103.

There is thus a need for, and it would be highly advantageous to have a method of failover and load sharing between distinct virtual systems 103 of different cluster members 101, a method which maximizes efficient use of available resources in the cluster with high availability, scalability and simple reconfigurability.

Figure 2:
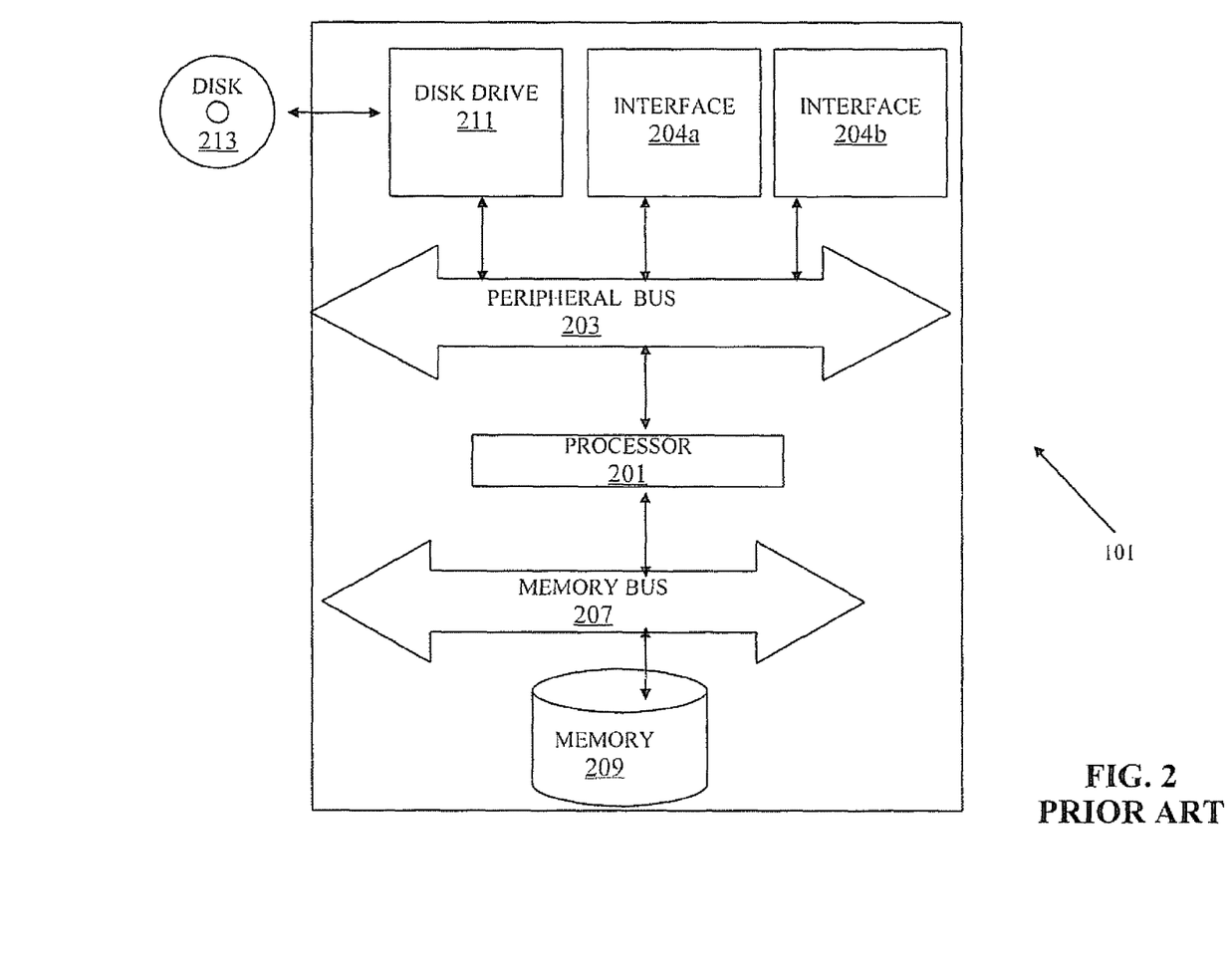
FIG. 2 (prior art) illustrates a computer, for instance, cluster member 101.

Reference is now made to FIG. 2 (prior art) which illustrates a computer, for instance cluster member 101. Cluster member 101, includes a processor 201, a storage mechanism including a memory bus 207 to store information in memory 209 and a first and second interface 204 connecting to networks 111. Each interface 204 is operatively connected to processor 201 with a peripheral bus 203. Cluster member 101 further includes a data input mechanism 211, e.g. disk drive from a program storage device 213, e.g. optical disk. Data input mechanism 211 is operatively connected to processor 201 with a peripheral bus 203. Virtual systems 10) are installed in memory 209 and run by processor 201.

The term "virtual system" as used herein is an application installed in a computer, wherein the application performs a function and wherein the computer is not dedicated solely for the function or a single instance of the function. There is a least a potential for more than one "virtual system" to be installed on the computer, each "virtual system" using its own segment of memory attached to the computer; a "virtual system" functions identically or similarly to a non-virtual or dedicated system, e.g. non-virtual firewall system; "virtual systems" are individually configured and managed even if installed on the same computer 101; if a "virtual system" performs a function in a network, each "virtual system" installed may be connected to different network, either physical or virtual (VLAN); aid failure in one virtual system does not necessarily cause a failure in other virtual systems installed in the same computer 101. For further information regarding "virtual systems" and clusters thereof; reference is made to Check Point user information document (701171 March 2006) entitled "Check Point VSX Version NGX R60" included herein for all purposes as if fully set forth herein.

Hereinafter, the terms "virtual system" and "application" are used interchangeably in the context of parallel processes running under a single operating system in a computer.

The terms "application group" or "virtual system group" as used herein interchangeably, refers to multiple copies of the same application or process ruffling in different computers of a cluster.

The term "virtual system" should not be confused with the term "virtual machine". A "virtual machine", or "hardware virtual machine", includes different execution environments on a single computer; each of which runs an operating system. The "virtual machine" (not related to the present invention) allows processes written for one operating system to be executed on a machine which runs a different operating system, or provide execution "sandboxes" which provide a greater level of isolation between processes but requires more resources than when running multiple processes on the same instance of an operating system.

The terms "monitoring" and "detecting" as used herein referring to a load or failure of a virtual system includes both automatic monitoring and detecting such as by a machine or manual monitoring and detection by a human being.

The term "memory" as used hereinafter refers to any type of computed memory or information storage device including

SUMMARY OF THE INVENTION

According to the present invention there is provided a method for load sharing and high availability in a cluster of computers The cluster includes a first computer and a second computer which perform a task. An active application runs in the first computer and a standby application is installed in the second computer. The active application and the standby application are included in all application group. A first plurality of applications is installed in the first computer; the first plurality includes the running active application. All applications of the first plurality and the standby application have identical functionality for performing the task. The active application performs the task and stores state parameters and a policy in memory of the first computer A synchronized copy of the state parameters and the policy pertaining to the task is maintained by storing in memory of the second computer. Preferably, the cluster is in a security gateway between data networks and performs a task related to security of one or more of the networks. Preferably, the task includes one or more of filtering, malicious code scanning, authentication, auditing, encryption, intrusion detection, virus detection, worm detection, quality of service, secure sockets layer termination, link translation and/or routing. The first plurality preferably further includes a second standby application. A second plurality of applications is preferably installed in said second computer and includes the standby application and a second active application with the identical functionality The second standby application and the second active application are included in a second application group. When the cluster further includes a third computer, a third plurality of applications runs in the third computer the third plurality preferably includes a backup application, and the backup application is further included in the application group. Preferably, the backup application maintains, stored in memory, e.g. hard disk of the third computer, a synchronized copy of the policy but the state parameters are not synchronized. Preferably, the application croup is monitored for failure and when a failure is detected in the active application, load of the active application is transferred to the standby application and the state of the standby application is upgraded to active, producing a new active application. Upon recovering from the failure, the state of the standby application is preferably restored (manually or automatically). When the cluster includes a third computer and when the application group includes a backup application running in the third computer; and when a failure is detected in the active application, the backup application is synchronized with the new active application and the backup application is thereby upgraded to a standby state. When recover from failure occurs, the state of the backup virtual state is preferably restored. Preferably, the application group is monitored for load balance between the computers and upon detecting a load imbalance between the computers, load is redistributed between the active application and the standby application. Preferably, the active application and the standby application are configured for high availability and/or load sharing. The running of the active application with the standby application includes synchronizing preferably by performing a unicast data transfer between the active and the standby applications.

According to the present invention there is provided, a cluster of computers including a first computer and a second computer. An active application runs in the first computer and a standby application is installed in the second computer. The active application and the standby application form an application group. A first plurality of applications run in the first computer. The first plurality includes the active application. All applications of the first plurality and the standby application have identical functionality for performing a similar task. The cluster includes: a synchronization mechanism which synchronizes the standby application by storing in memory of the second computer a synchronized copy of the state parameters and the policy pertaining to the filtering The synchronization is preferably performed by unicast data transfer between the active application and the standby application Preferably, a mechanism monitors for failure within the application group, and when a failure is detected in the active application, a mechanism upgrades the standby application to an active state, and the standby application becomes a new active applications Preferably, the cluster includes a mechanism which monitors for load balance between the computers and upon detecting a load imbalance between the computers, load is redistributed between the active application and the standby application When the the application group includes a backup application, the cluster includes a third computer which runs the backup application and when a failure is detected in the active or standby application, a mechanism upgrades the backup application to a standby state and initiates synchronization with the active application According to the present invention there is provided a program storage device readable by a computer in a cluster including a first computer and a second computer. The program storage device tangibly embodies a program of instructions executable by the computer to perform a method for performing a task by configuring and running an active application in the first computer and configuring a standby application in the second computer; wherein the active application and the standby application form an application group; wherein a first plurality of applications are installed in the first computer, wherein the first plurality includes the active application. The running of the active application includes performing the task and storing in memory of the first computer state parameters and a policy pertaining to the task. A synchronized copy of the state parameters and the policy are stored in memory of the second computer, in the standby application. Preferably, all applications standby, active and backup installed in all the computers of the cluster are programmed by the same program of instructions stored on the program storage device.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system and method of failover and load sharing in a cluster. Specifically, the system and method includes failover and load sharing between virtual systems or applications shared between multiple cluster members 101.

Prior art clusters which provide redundancy, high capacity and failover are "connection based", (e.g. source/destination, IP address and port number). Load is shared based on connections. When a cluster member, for instance 101*a* fails, connections handled by 101*a* are re-routed to other cluster members for instance 101*b* and/or 101*c*. In embodiments of the present invention, as opposed to prior art clusters provided high availability, redundancy and failover are not based on connections. Functions such as high availability, load sharing and failover are achieved without having to manage connections.

The principles and operation of a system and method of high availability and load sharing between virtual systems in a cluster of computers, according to the present invention, may be better understood with reference to the drawings and the accompanying description.

It should be noted, that although the discussion herein relates primarily to virtual systems which perform as firewalls in a network. e.g. LAN or other sub-network the present invention may, by non-limiting example, alternatively be configured as well using virtual systems which perform other security applications such as encryption, intrusion detection, and malicious code scanning, and filtering, e.g. parental control filtering, authentication, auditing, encryption, virus detection, worm detection, quality of se-vice and/or routing. The present invention in some embodiments can be configured as an application gateway to perform secure sockets layer (SSL) termination including encryption, and link translation. The present invention may alternatively be configured as well using virtual systems which perform functions unrelated to computer security, e.g. searching in a data base Further, a function, such as mathematical processing, may be performed, according to an embodiment of the present invention in a cluster of computers not attached to an external network Computer or cluster member 101, in different embodiments of the present invention may use dedicated hardware, e.g. additional interfaces 204, for transferring data individually to virtual systems and/or portions of memory 209 specifically allocated to individual virtual systems or a dedicated processor 201 in case there are multiple processors 201. In some cases, previously existing cluster 101 cluster members may be reprogrammed to achieve a cluster with virtual system load sharing and high availability, according to embodiments of the present invention.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, principal intentions of the present invention are to:

(1) provide increased availability and/or redundant load sharing within a cluster;

(2) provide configuration simplicity with a preferably identical configuration within all cluster members;

(3) system scalability with each cluster, member increasing capacity and redundancy in a similar way; and (4) reduce system overhead by performing synchronization solely by unicast data transfer only between specific cluster members and not by broadcast of data transfer between all cluster members.

Figure 3:
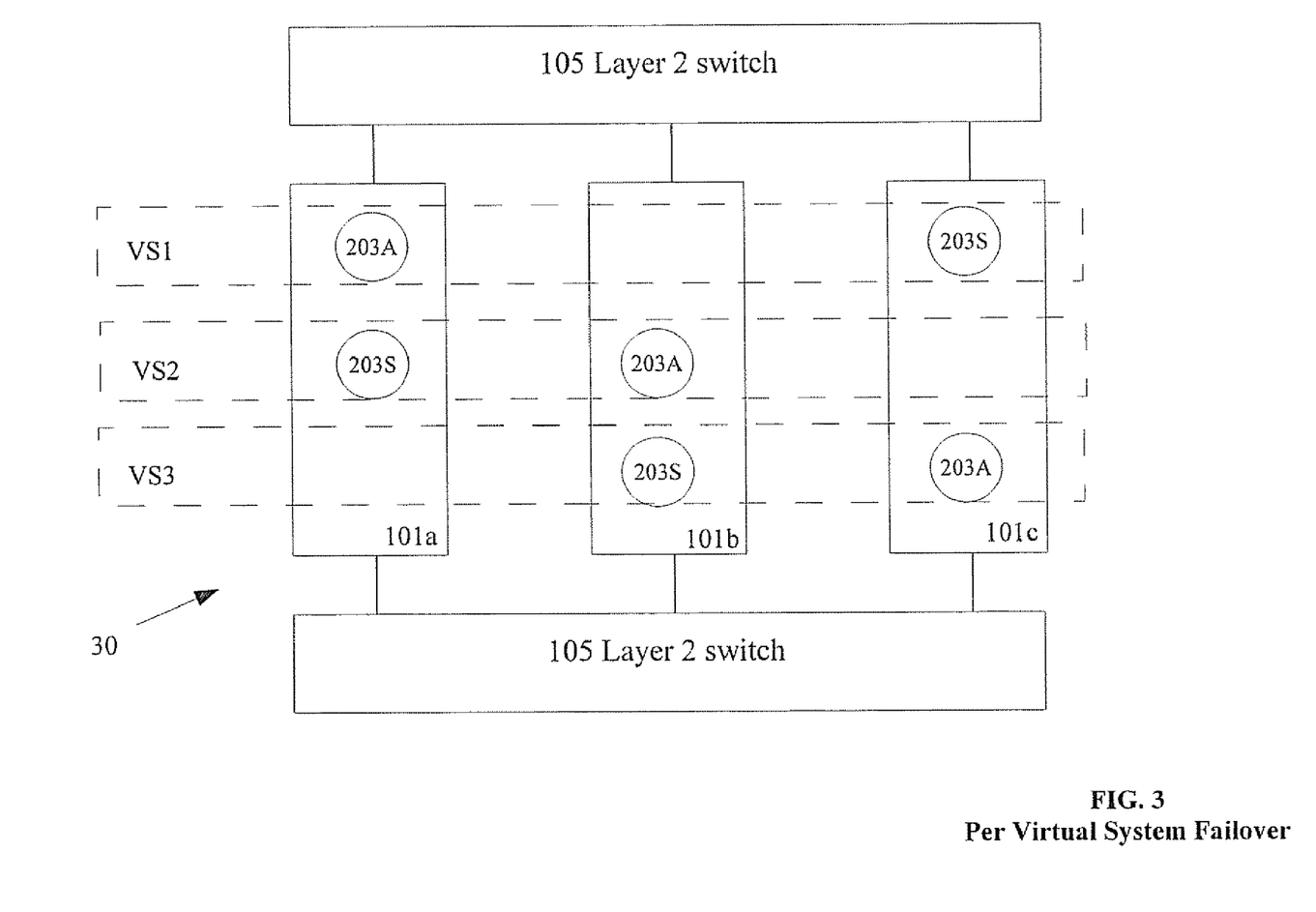
FIG. 3 is simplified system drawing, according to an embodiment of the present invention which employs "per virtual system failover"

Referring now to the drawings, FIG. 3 illustrates system 30, according to an embodiment of the present invention which employs "per virtual system failover". In system 30, a virtual system group VS includes one active virtual system 203A and one standby virtual system 203S. Active virtual system 203A and standby virtual system 203S are each installed in different cluster members 101. Active virtual system 203A and standby virtual system 203S are synchronized both in state parameters and policy, so that standby copy 203S becomes active if virtual system 203A, stored in cluster member 101*a*, experiences a failure. Policy is updated occasionally, such as once or twice per day, whereas state parameters or connection table is synchronized typically every transaction performed by the active application and typically not more than about ten thousand times per second preferably by unicast data transfer from active virtual system 203A to standby virtual system 203S. Upon recovery, system 203A is restored to the original active state and virtual system 203S is restored to a standby state. System 30 illustrates cluster members attached using layer 2 switch 105; however another preferably layer 2 networking device such as a hub, may be used to connect cluster members 101.

Further, cluster members 101 in different embodiments may be distributed in different external networks and attached over network connections provided a mechanism ensures that each cluster member 101 receives its required traffic. An example of a distributed cluster includes cluster members 101 as virtual private network (VPN) gateways running VPNs as virtual systems 203.

Cluster members 101 may be interconnected by one or more additional synchronization networks, not shown, through which the synchronization (e.g. of state parameters, policy) and/or management can be performed.

Cluster members 101 can be connected to a number of layer 2 devices 105 and each may be connected to any number of networks 111.

Figure 4:
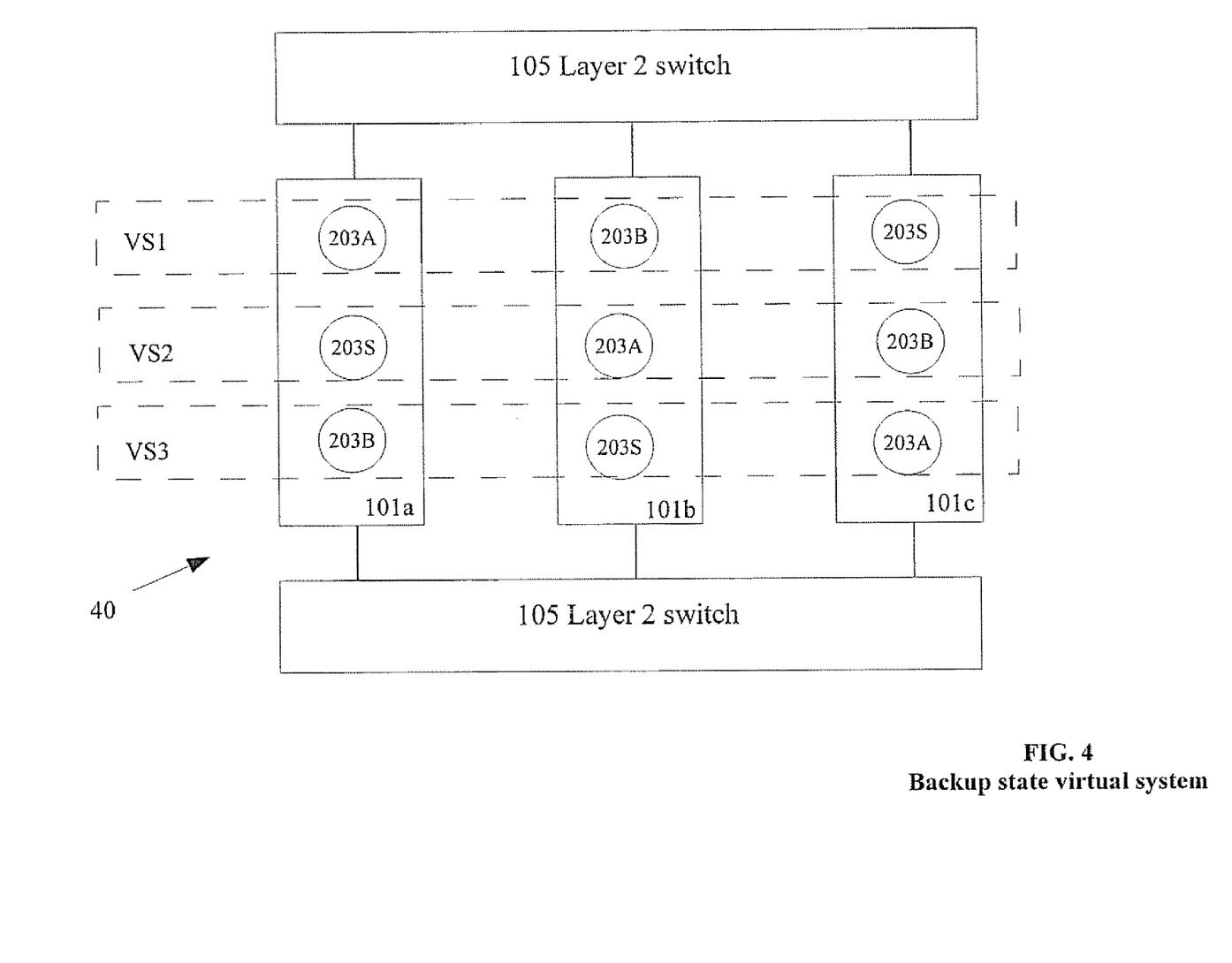
FIG. 4 illustrates, a system and failure modes, according to another embodiment of the present invention.

FIG. 4 illustrates, system 40 according to another embodiment of the present invention in which virtual system group VS includes an additional virtual system in a "backup" state 203B in addition to standby state 203S and active state 203A of the virtual system. Backup state virtual system 203B contains updated configurational settings, e.g. firewall policy of virtual systems 203 but does not receive state parameter or connection table synchronizations. Hence, the use of backup state 203B saves resources of cluster member 101 particularly processor time and saves bandwidth on the synchronization network.

Figure 4A:
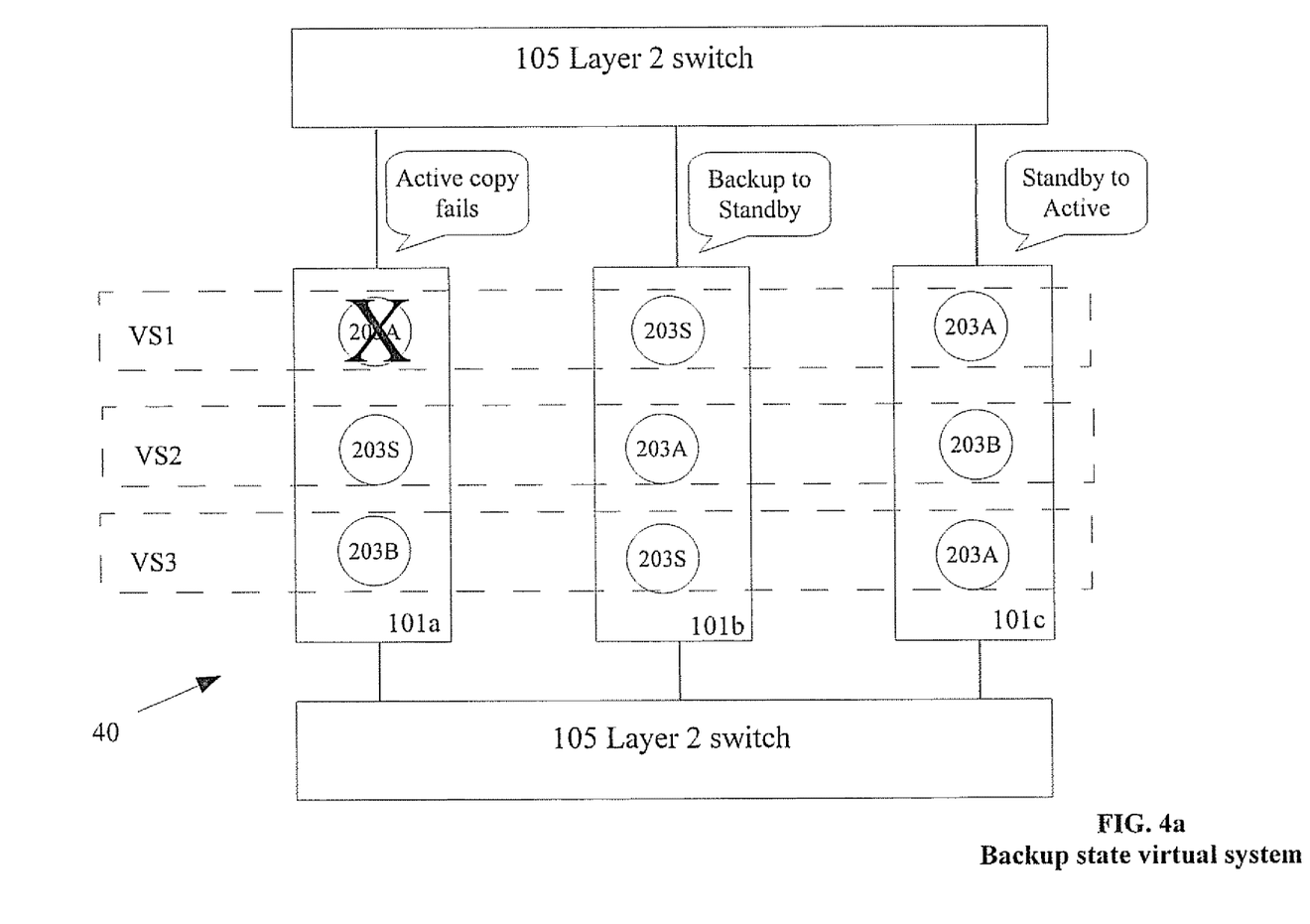

As in system 30, active virtual system 203A and standby virtual system 203S are synchronized so that standby copy 203S becomes active if cluster member 101 storing active virtual system 203A experiences a failure. Furthermore, when the failure occurs in system 40, backup virtual system 203B is upgraded to become a standby virtual system 203S and begins to synchronize with newly active virtual system 203A. Upon recovery, system 203A is restored to the original active state and virtual system 203S is restored to a standby state and virtual system 203B is restored to a backup state. An example of backup state failover is illustrated in FIG. 4*a*. In the example, active virtual system 203A installed in cluster member 101*a* is synchronized with standby virtual system 203S in cluster member 101*c* undergoes a failure, denoted by "X" in FIG. 4*a*. Standby virtual system 203S in cluster, member 101*c* becomes active, (now virtual system 203A) and backup virtual system 203B installed in cluster member 101*b* becomes standby virtual system 203S which begins to synchronize with newly active virtual system 203A installed in cluster member 101*c*.

Figure 4B:
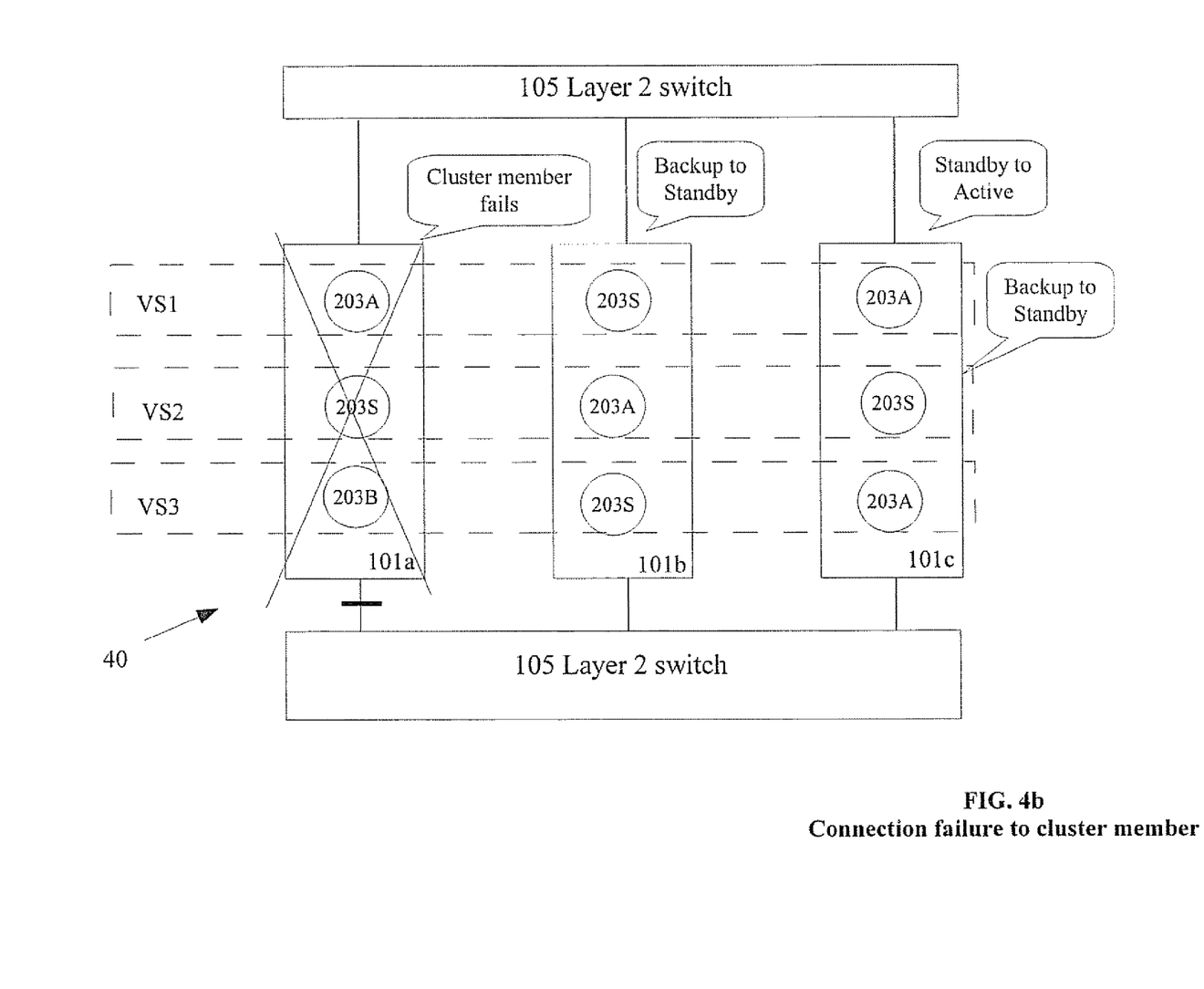

Another failure mode is illustrated in FIG. 4*b* in which cluster member 101*a* fails entirely for instance due to a connection failure to power or to network interface 204. As in the example of FIG. 4*a*, standby virtual system in cluster member 101*c* becomes active, now virtual system 203A and backup virtual system 203B installed in cluster member 101*b* becomes standby virtual system 203S and synchronizes with newly active virtual system 203A installed in cluster member 101*c*. Similarly, backup virtual system 203B of cluster member 101*c* now becomes standby virtual system 203S and begins to synchronize with its active copy virtual system 203A installed in cluster member 101*b*. On recovery from either failure mode, of FIG. 4*a* or FIG. 4*b*, the system is restored to the original state of system 40 in FIG. 4*d*. Alternatively, the original states of virtual systems 203 are not restored on recovery, and a manual re-configuration is used to restore the original configuration if desired.

Figure 5:
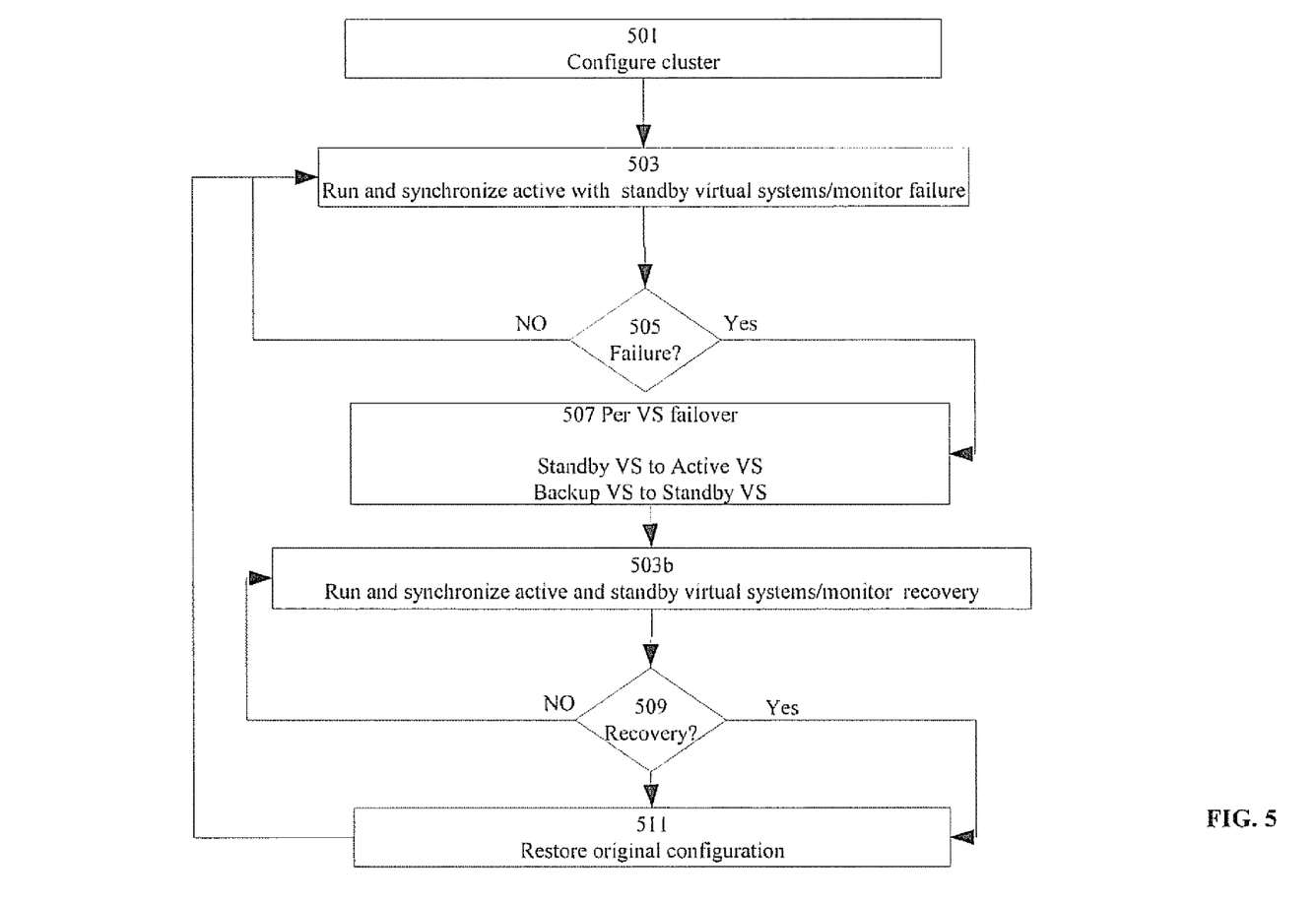
FIG. 5 is a simplified flow diagram showing operation of virtual system high availability, according to an embodiment of the present invention.

Reference is now made to FIG. 5, a simplified flow diagram according to the embodiment 40 (of FIG. 4) of the present invention. Cluster 10 is physically connected and configured (step 501) preferably with virtual system groups VS with an active virtual system 203A, a standby virtual system 203S and a backup virtual system 203B each in different cluster members 101. After configuration, (step 501), cluster 10 operates (step 503) and during operation active virtual systems 203A are periodically synchronized (step 503) with standby virtual systems 203S, preferably by unicast data transfer. If a failure occurs. (decision block 505) then for each virtual system 203 involved in the failure, standby virtual system 203S is upgraded (i.e. failover) to active virtual system 203A and similarly backup virtual system 203B is upgraded (i.e. failover) to standby virtual system 203S. Operation and synchronization (step 503*b*) between new active virtual system 203A and standby virtual systems 203S proceeds in cluster 10 albeit with limited resources due to the failure. Upon automatic monitoring and detection of recovery (decision block 509) the original configuration is preferably restored (step 511) and operation and synchronization (step 503) proceed as prior to failure. Otherwise, if there is no automatic monitoring and detection of recovery, and the failure is detected manually, the original cluster configuration may be restored manually.

Figure 6:
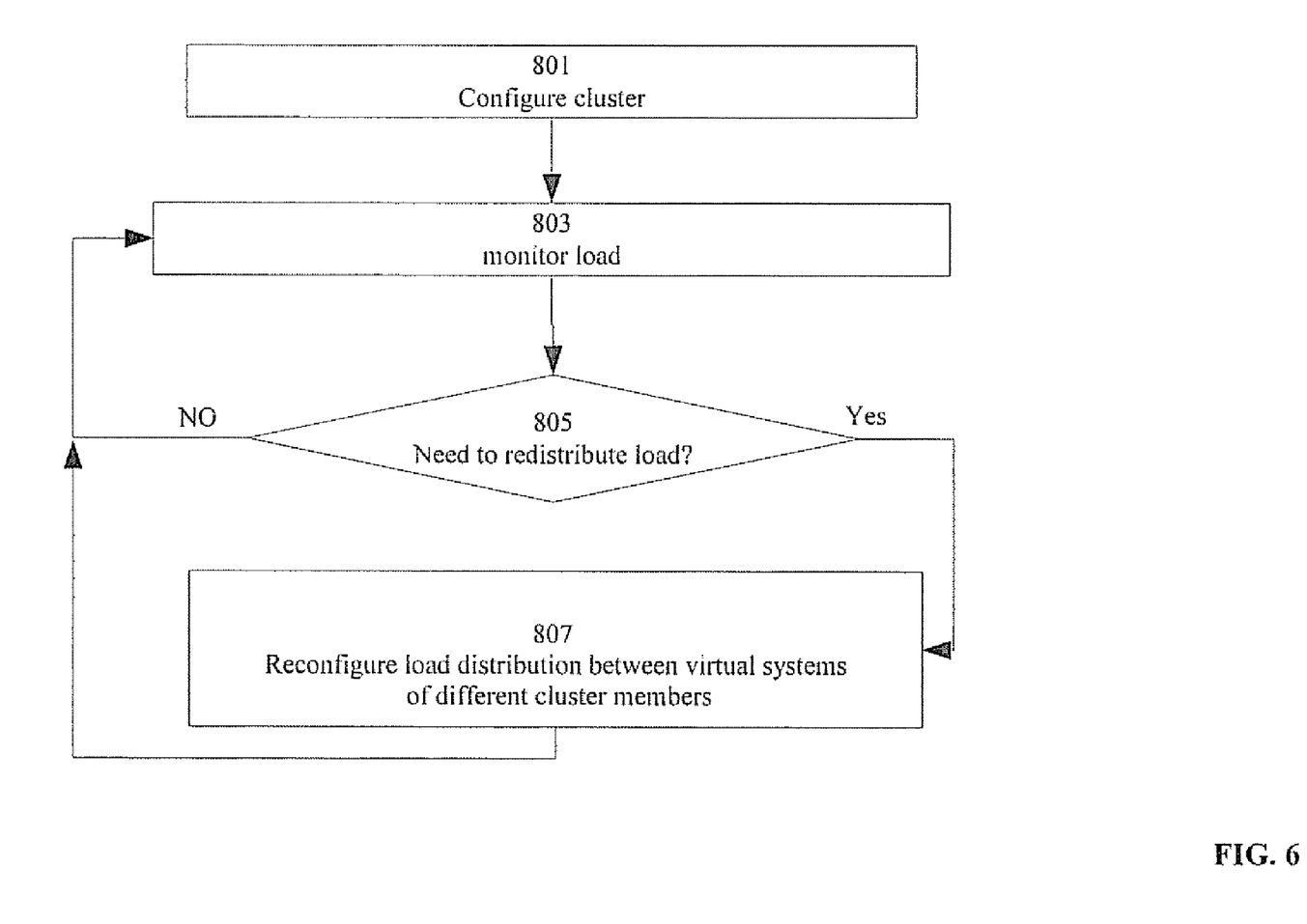
FIG. 6 is a simplified flow diagram showing operation of virtual system load sharing, according to an embodiment of the present invention.

Reference is now made to FIG. 6 a simplified flow diagram of load sharing in a virtual system cluster 40, according to embodiments of the present invention. Cluster 40 is configured (step 801) for load sharing. During configuration (step 801) parameters regarding load sharing between virtual systems 203 are set including priorities and/or weights which determine load sharing between virtual systems 203. Preferably, weights are chosen so that load is balanced between cluster members 101. In step 803, the load of each virtual system 203 is monitored. If there is a need to redistribute load (decision block 805) then cluster 40 is reconfigured (step 807) otherwise monitoring of load (step 803) continues.

The control mechanism in cluster 40 may be performed in a number of ways known in the art. Preferably, code in the kernel driver of one or more cluster members 101 periodically monitor (e.g. by polling or "watchdog") the state of all cluster members 101 and interfaces between cluster members 101 and virtual systems 203. In the event of a failure in a virtual system 203, the kernel driver changes the role of virtual systems 203 of the cluster as described above.

As such, those skilled in the art will appreciate that the conception, upon which this disclosure is based, may readily be utilized as a basis for the designing of other structures, methods and systems for carrying out the several purposes of the present invention,. It is important, therefore, that the claims be regarded as including such equivalent constructions insofar as they do not depart from the spirit and scope of the present invention.

While the invention has been described with respect to a limited number of embodiments, it will be appreciated that many variations, modifications and other applications of the invention may be made.

What is claimed is:

1. A method for enabling high availability and load sharing of highly-replicated applications in computer clusters, the method comprising the steps of:
   (a) providing at east two computers operationally connected to each other;
   (b) designating a plurality of identical application groups, wherein each said application group includes one active application and one standby application that:
      (i) have synchronized state parameters;
      (ii) have synchronized security policies; and
      (iii) are configured to run on different computers of said at least two computers,
      and wherein each said application group includes one backup application, and wherein respective backup applications have non-synchronized state parameters and synchronized security policies with respective application groups;
   (c) initially allocating said plurality of application groups to said at least two computers such that active applications are distributed according to an allocation policy among said at least two computers;
   (d) upon detection of at least one event during application operation: activating said respective standby applications to newly-designated respective active applications, while changing said respective backup applications to newly-designated respective standby applications, only for application groups affected by respective events in order to continue said application operation.

2. The method of claim 1, the method further comprising the step of:
   (f) upon recovering from said at least one event, restoring said newly-designated respective active applications to restored respective standby applications, restoring said newly-designated respective standby applications to restored respective backup applications, and designating subsequent respective active applications only for application groups affected by said respective events.

3. A system for enabling high availability and load sharing of highly-replicated applications in computer clusters, the system comprising:
   (a) at least two computers operationally connected to each other, said at least two computers configured to have a plurality of identical application groups, wherein each said application group includes one active application and one standby application that:
      (i) have synchronized state parameters;
      (ii) have synchronized security policies; and
      (iii) are configured to run on different computers of said at least two computers;
   wherein each said application group further includes one backup application, wherein respective backup applications have non-synchronized state parameters and synchronized security policies with respective application groups, wherein said plurality of application groups are configured to be initially allocating to said at least two computers such that active applications are distributed according to an allocation policy among said at least two computers; and wherein said respective standby applications are configured to be activated to newly-designated respective active applications and said application groups are configured to change said respective backup applications to newly-designated respective standby applications, upon detection of at least one event during application operation, only for application groups affected by respective events in order to continue said application operation.

4. The system of claim 3, wherein said plurality of application groups are configured to restore said newly-designated respective active applications to restored respective standby applications, to restore said newly-designated respective standby applications to restored respective backup applications, and to designate subsequent respective active applications, upon recovery from said at least one event, only for application groups affected by said respective events.

5. A computer-readable storage medium having computer-readable code embodied on the computer-readable storage medium, the computer-readable code comprising:

(a) program code for designating a plurality of identical application groups, wherein each said application group includes one active application and one standby application that:
　(i) have synchronized state parameters;
　(ii) have synchronized security policies; and
　(iii) are configured to run on different computers of at least two computers operationally connected to each other, and wherein each said application group includes one backup application, and wherein respective backup applications have non-synchronized state parameters and synchronized security policies with respective application groups;

(b) program code for initially allocating said plurality of application groups to said at least two computers such that active applications are distributed according to an allocation policy among said at least two computers; and (c) program code for, upon detection of at least one event during application operation, activating said respective standby applications to newly-designated respective active applications while changing said respective backup applications to newly-designated respective standby applications, only for application groups affected by respective events in order to continue said application operation.

* * * * *